United States Patent Office 2,883,406
Patented Apr. 21, 1959

2,883,406
PHENOL ADDITION SALTS

James L. Jezl, Swarthmore, Pa., assignor to Sun Oil Company, Philadelphia, Pa., a corporation of New Jersey No Drawing. Application April 21, 1955
Serial No. 503,017

5 Claims. (Cl. 260—429.9)

This invention relates to new compounds having fungicidal and other beneficial properties.

The compounds according to the invention have the formula:

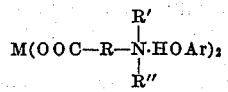

where R is a hydrocarbon radical having 1 to 40 carbon atoms or a radical having the formula —rCOOC$_2$H$_2$r'r''— where r is a divalent hydrocarbon radical having 1 to 40 carbon atoms and r' and r'' are hydrogen or a monovalent hydrocarbon radical having 1 to 10 carbon atoms, where R' and R'' are hydrogen or an alkyl radical having 1 to 5 carbon atoms or a hydroxyalkyl radical having 1 to 5 carbon atoms, where Ar is an aryl radical, and where M is copper, zinc, iron, or mercury.

The radicals R, r, r' and r'' preferably contain no more than four and more preferably no more than two, olefinic double bonds including cyclo-olefinic double bonds. The radical R is preferably either an alkylene radical, an arylene radical, or a cycloalkyl alkylene or aryl alkylene radical formed by replacing one or more hydrogens of an alkylene radical with a cycloalkyl or aryl radical. The radical r is also preferably either an alkylene radical, an arylene radical, a cycloalkyl alkylene radical, or an aryl alkylene radical. The radicals r' and r'' are preferably either an alkyl radical, a cycloalkyl radical, or an aryl radical.

Compounds according to the invention are generally prepared by a process involving the following steps: (1) Formation of a copper, zinc, iron or mercury salt of an amino carboxylic acid, and (2) reaction of the resulting metal carboxylate with a phenol to produce a salt of the latter with the amino group of the metal carboxylate.

This preparation may be illustrated with reference to 11-amino undecanoic acid as starting material. This acid may be reacted with an alkali metal basic compound, e.g. sodium hydroxide, to produce the sodium salt, and the latter reacted with a zinc compound to produce the zinc salt, Zn[OOC(CH$_2$)$_9$CH$_2$NH$_2$]$_2$; the latter may then be reacted with pentachlorophenol to give a compound according to the invention Zn[OOC(CH$_2$)$_9$CH$_2$NH$_2$·HOC$_6$Cl$_5$]$_2$ In one embodiment of the invention, the preparation may involve, as a preliminary step, the formation of an amino carboxylic acid by reaction of a dibasic acid or anhydride thereof with an alkanolamine to produce a mono-ester containing an amino group and a free carboxyl group. The alkanolamine in this instance preferably has a tertiary nitrogen atom, since formation of an ester rather than an amide is thereby favored, whereas the tendency for amide formation is greater in the case of primary and secondary alkanolamines. The mono-ester may then be reacted with a metal and with a phenol in the manner previously indicated.

A preferred manner of preparing the copper, zinc, iron or mercury salt of the amino acid is by admixing an aqueous solution of an alkali metal salt of the amino acid with an aqueous solution of a copper, zinc, iron or mercury compound, e.g. cupric sulfate, cupric acetate, zinc chloride, zinc acetate, mercuric acetate, mercuric nitrate, etc. The reaction can be carried out at room temperature or higher temperatures, e.g. up to the boiling point though preferably not above 150° F. Preferably, the amount of metal compound employed is at least a stoichiometric amount, and an excess, e.g. a 10% molar excess, may be employed. Preferably, the reaction is carried out in the presence of a small amount of an alkali metal basic material such as sodium hydroxide.

The alkali metal salt used in the preparation may have been previously prepared for example by heating to the boiling temperature with reflux, an aqueous solution of an alkali metal hydroxide and the amino acid in the presence of a suitable solvent such as ethanol. The alkali metal hydroxide may be used in a stoichiometric amount or in excess.

In one embodiment of the invention, the compounds have the formula

M(OOC—r—COOC$_2$H$_2$r'r''NR'R''·HOAr)$_2$ where the various symbols are as described in the second paragraph of the specification Such compounds may be prepared by reacting the anhydride of a dibasic acid HOOC—r—COOH with an alkanolamine HOC$_2$H$_2$r'r''NR'R'' to form a mono-ester and reacting the latter with copper, zinc, iron or mercury and then with a phenol to produce the desired compound. Suitable alkanolamines include those wherein r' and r'' are both hydrogen, e.g. diethyl ethanolamine, those wherein neither r' nor r'' is hydrogen, e.g. (CH$_3$)$_2$COHCH$_2$N(C$_2$H$_5$)$_2$ which may be formed by reaction of isobutylene oxide

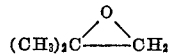

with diethyl amine, and CH$_3$CHOHCH(CH$_3$)N(C$_2$H$_5$)$_2$ which may be formed by reaction of 2,3-epoxy butane

with diethyl amine, and those wherein r' is hydrogen and r'' another radical, e.g. diethyl isopropanolamine which may be formed by reaction of propylene oxide with diethyl amine, or C$_6$H$_5$CHOHCH$_2$N(C$_2$H$_5$)$_2$ which may be formed by reaction of styrene oxide

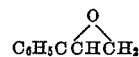

with diethyl amine, etc. Where r' and r'' are both radicals other than hydrogen, they may be attached to different carbon atoms, or both to the carbon atom attached to the hydroxyl, or both to the carbon atom attached to the nitrogen atom. Where r' is hydrogen and r'' another radical, r'' may be attached to the carbon atom attached to the hydroxyl or to the carbon atom attached to the nitrogen atom.

Suitable dibasic acids and anhydrides for use in this embodiment of the invention include malonic acid, adipic acid, succinic acid, sebacic acid, pimelic acid, azelaic acid, decane dicarboxylic acid, the corresponding anhydrides, etc. Higher molecular weight dicarboxylic acids can be obtained for example by dimerizing esters of unsaturated monocarboxylic acids, e.g. methyl linoleate, and hydrolyzing the resulting dimer of the ester.

Dibasic acids wherein r is a cycloalkyl alkylene or aryl alkylene radical can be prepared by reacting a dibasic acid such as adipic acid with a halogen, e.g. chlorine, to form for example HOOCCHClCH$_2$CH$_2$CH$_2$COOH and reacting the latter with a cycloalkyl halide or aryl halide in the presence of sodium metal to replace the chlorine atom with the cycloalkyl radical or aryl radical.

Suitable alkanolamines for use in this embodiment of the invention include for example diethyl ethanolamine, ethyl diethanolamine, triethanolamine, etc. Where a polyhydroxy alkanolamine is used, formation of polyesters with the dibasic acid can be avoided for example by replacing the active hydrogen of one carboxyl group of the acid with a nonreactive atom or radical before reacting the acid with the alkanolamine. Alternatively, the active hydrogen of all but one hydroxyl group of the alkanolamine may be replaced by a nonreactive atom or radical.

Preferred compounds for use in this embodiment of the invention are those having the formula M(OOC—r—COOCH$_2$CH$_2$N—R''·HOAr)$_2$
  |
  R' where r is a straight or branched chain alkylene radical having 4 to 12 carbon atoms, R' and R'' are alkyl or hydroxyalkyl radicals having 2 to 4 carbon atoms, Ar is a halophenyl radical, and M is copper, zinc, iron or mercury.

Preferred compounds for use in another embodiment of the invention are those amino carboxylic acid derivatives having the formula M(OOCRNH$_2$·HOAr)$_2$ where R is a straight or branched chain alkylene radical having 1 to 20 carbon atoms, where Ar is a halophenyl radical, and where M is copper, zinc, iron or mercury. Suitable amino carboxylic acids include alpha-amino acids, omega-amino acids, and amino acids with intermediate positioning of the amino group. Examples of suitable amino acids are glycine NH$_2$CH$_2$COOH, alanine CH$_3$CH(NH$_2$)COOH, leucine C$_4$H$_9$CH(NH$_2$)COOH, valine (CH$_3$)$_2$CHCH(NH$_2$)COOH, 6-amino caproic acid, 11-amino undecanoic acid, etc. Particularly preferred compounds for this embodiment are those wherein R is a straight chain radical having 6 to 14 carbon atoms.

The compositions according to the invention contain at least 16 carbon atoms per molecule and may in some cases contain as many as 100 carbon atoms. Preferably the compositions contain at least 30 carbon atoms per molecule, since the larger numbers of carbon atoms tend to make the compositions soluble in hydrocarbons, so that they can be conveniently employed as solutions in hydrocarbons, such as n-pentane, petroleum naphtha, benzene, petroleum spirits, etc.

The novel compositions of the invention are useful for a variety of purposes, e.g. as fungicides, insecticides, bactericides, roden repellents, seed preservatives, wood, paper, cordage, leather and fabric preservatives, etc. They may be used as fungicides, for example, by impregnating a textile material with a hydrocarbon solution of the composition, whereby the textile material is rendered resistant to attack by fungi under circumstances that would ordinarily produce severe attack, e.g. upon exposure to mushroom soil, etc.

Example I

A composition was prepared having the following formula:

Cu[OOC(CH$_2$)$_8$COO(CH$_2$)$_2$N(C$_2$H$_5$)$_2$·HOC$_6$Cl$_5$]$_2$

The prepartion was accomplished by the following steps: (1) Esterification of one carboxyl of sebacic acid with diethyl ethanolamine, (2) formation of the sodium salt of the other carboxyl, (3) replacement of sodium in the salt with copper, and (4) reaction of the copper salt with pentachlorophenol to form the desired composition.

The prepartion of the mono (diethyl ethanolamine) sebacate was as follows: 200 ml. of toluene, 23.4 grams of diethyl ethanolamine, and 40.4 grams of sebacic acid were admixed and heated to reflux temperature, water being trapped from the condensate before return of the latter to the distillation zone. The refluxing was continued until 3.2 ml. of water had been collected.

The preparation of the copper salt of the ester was as follows: About half of the toluene solution of the ester, as obtained in the esterification, was admixed with 4.21 grams of sodium hydroxide, 50 ml. of ethanol, and just sufficient water to dissolve the sodium hydroxide in the ethanol. The mixture was stirred at room temperature for two hours, the sodium salt of the ester being formed by reaction of sodium hydroxide with the ester. 50 ml. of water was added; two layers were formed, most of the sodium salt dissolving in the water layer. The layers were not separated, however, and both were gradually added, over a period of an hour, to 200 ml. of water and 100 ml. of benzene in a flask while simultaneously adding an aqueous solution of 10.5 grams of copper acetate in about 200 ml. of water. The reaction of copper acetate with the sodium salt of the monoester to form the copper salt of the mono-ester occurred at room temperature.

The preparation of the pentachlorophenate was as follows: The benzene-toluene layer containing copper salt of the mono-ester, as obtained above, was separated from the aqueous layer and admixed at room temperature with stirring with a stoichiometric amount of pentachlorophenol, i.e. with one mole of pentachlorophenol per two moles of original diethyl ethanolamine (only half of the ester having been employed in the salt formation). The resulting solution was filtered to remove a small amount of insoluble material. Benzene and toluene were stripped from the solution to obtain as residue the desired composition, which was a solid at room temperature. The composition was found to be soluble in acetone or ethanol in at least ten percent concentration. Its solubility in petroleum spirits was less than one percent and very slight. The softening point, or temperature at which it dripped from a thermometer bulb, was about 55° C.

In the esterification of a dibasic acid HOOC—R—COOH with a monohydric alcohol R'OH, the following are some of the possible reactions:

$$\text{HOOC—R—COOH} + \text{R'OH} \qquad (1)$$
$$\rightarrow \text{R'OOC—R—COOH} + \text{H}_2\text{O}$$

$$\text{HOOC—R—COOH} + 2\text{R'OH} \qquad (2)$$
$$\rightarrow \text{R'OOC—R—COOR'} + 2\text{H}_2\text{O}$$

$$\text{R'OOC—R—COOR'} + \text{HOOC—R—COOH} \qquad (3)$$
$$\rightarrow 2\text{R'OOC—R—COOH}$$

Where monoester R'OOC—R—COOH is the desired product, one mole of dibasic acid per mole of alcohol should be used, Reaction 1 being a desired reaction. To the extent that Reaction 2 occurs, unless counterbalanced by Reaction 3, diester and unreacted dibasic acid will appear in the esterification products. If Reaction 3 completely counterbalances Reaction 2, diester and unreacted dibasic acid will not appear in the esterification products.

In the preceding example, the mono-ester was not separated from other constituents, if any, of the esterification products. If desired, such separation can be effected by distillation or other suitable means. If unreacted dibasic acid remains in the esterification products, copper salt thereof is probably formed in the subsequent reaction with copper acetate. Amide formation or formation of stable salts of the dibasic acid with nitrogen atoms of the original alkanolamine or of the esters thereof is not believed to be significant, since the tertiary nature of the nitrogen atoms tends to preclude formation of amides or stable salts.

Example II

A composition having the formula $$Zn[OOC(CH_2)_{10}NH_2 \cdot HOC_6H_2Cl_3]_2$$

is prepared as follows:

One-quarter mole (about 50 grams) of 11-amino undecanoic acid in 100 ml. of ethanol is neutralized with caustic soda containing about 0.26 mole of sodium hydroxide. The resulting solution is diluted with water to 200 ml. 250 ml. of benzene and 250 ml. of distilled water are placed in a 3-liter flask. The previously prepared aqueous solution of sodium 11-amino undecanoate, and a solution of about 0.14 mole of zinc sulfate in 200 ml. of water are added simultaneously at room temperature to the flask with agitation, while maintaining a greater volume of zinc sulfate solution in the flask than of the sodium salt solution. The mixture is stirred for an additional hour; then the layers are separated and the benzene layer washed with water.

The benzene layer is admixed with trichlorophenol with stirring at room temperature in a molar ratio of 1:2. The reaction between the salt and trichlorophenol occurs quite rapidly to produce a salt having the formula indicated at the beginning of this example. The salt has highly satisfactory fungicidal properties.

Salt-forming phenols generally are suitable for preparation of the compounds according to the invention. Such phenols are considered to include, for the purposes of the present invention, both monocyclic and polycyclic aromatic compounds having at least one hydroxyl group directly attached to an aromatic nucleus. Monohydric phenols are preferred, but salt-forming polyhydric phenols can also be used. Monocyclic phenols are preferred, but salt-forming polycyclic phenols, such as naphthols, can be used. Examples of suitable phenols are the following: phenol itself; halogenated phenols such as pentachlorophenol, o-chlorophenol, m-chlorophenol, p-bromophenol, 2-bromo-4-phenylphenol, 2,4,6-trichlorophenol, 2,4,6 - tribromophenol, 2,2' - dihydroxy - 5,5' - dichlorodiphenyl methane; 2,2' - dihydroxy - 3,5,6,3',5',6' - hexachlorodiphenyl methane, hydrocarbon-substituted phenols such as o-cresol, m-cresol, p-cresol, anol, eugenol, isoeugenol, carvacrol, thymol, o-cyclohexylphenol, p-cyclohexylphenol, o-hydroxydiphenyl, p-hydroxydiphenyl; nitrated phenols such as o-nitrophenol; p-nitrophenol, 2,4-dinitrophenol, picric acid; other substituted phenols such as guaiacol, o-hydroxyacetophenone, p-hydroxyacetophenone; alphanaphthol, betanaphthol; catechol, resorcinol, hydroquinone, pyrogallol, phloroglucinol, etc.

In the formulas given herein for metal salts of amino acids, it is to be understood that internal complexes may be present, in the case of alpha-amino acids, whereby the metal atom may be linked to nitrogen atoms as well as to carboxyl groups.

The compounds according to the invention can be used as constituents of paints and other protective coatings, plastic coating or film forming materials, paraffin and microcrystalline wax compositions, etc. They can be used in aqueous compositions containing a dispersing agent, or in organic solvent compositions, e.g. pentane, petroleum spirits, benzene, acetone, linseed oil, etc. compositions. They can be incorporated in dusting compositions for the protection of stored goods, comprising a dry porous diluent, e.g. clay, talc, etc.

The invention claimed is:

1. A compound having the formula:

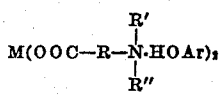

where R is selected from the group consisting of hydrocarbon radicals having 1 to 40 carbon atoms and radicals having the formula —$rCOOC_2H_2r'r''$—, $r$ being a divalent hydrocarbon radical having 1 to 40 carbon atoms and $r'$ and $r''$ being selected from the group consisting of hydrogen and hydrocarbon radicals having 1 to 10 carbon atoms, where R' and R'' are selected from the group consisting of hydrogen, alkyl radicals having 1 to 5 carbon atoms, and hydroxyalkyl radicals having 1 to 5 carbon atoms, where Ar is an aryl radical, where M is selected from the group consisting of copper, zinc, iron and mercury, and where R, r, r' and r'' have 0 to 4 olefinic double bonds.

2. Compound according to claim 1 wherein R is —$rCOOCH_2CH_2$— where $r$ is an alkylene radical having 4 to 12 carbon atoms and R' and R'' are selected from the group consisting of alkyl radicals having 2 to 4 carbon atoms and hydroxyalkyl radicals having 2 to 4 carbon atoms, and wherein Ar is a halophenyl radical.

3. Compound according to claim 1 wherein R is an alkylene radical having 1 to 20 carbon atoms, wherein R' and R'' are both hydrogen, and wherein Ar is a halophenyl radical.

4. Process for preparing a fungicide which comprises: (1) reacting a compound having the formula $$AlkOOC—R—NR'R''$$

where Alk is an alkali metal, where R is selected from the group consisting of hydrocarbon radicals having 1 to 40 carbon atoms and radicals having the formula —$rCOOC_2H_2r'r''$—, $r$ being a divalent hydrocarbon radical having 1 to 40 carbon atoms and $r'$ and $r''$ being selected from the group consisting of hydrogen and hydrocarbon radicals having 1 to 10 carbon atoms, where R' and R'' are selected from the group consisting of hydrogen, alkyl radicals having 1 to 5 carbon atoms, and hydroxyalkyl radicals having 1 to 5 carbon atoms, and where R, r, r' and r'' have 0 to 4 olefinic double bonds, with a compound of a metal selected from the group consisting of copper, zinc, iron and mercury, thereby to form a compound having the formula $M(OOCR—NR'R'')_2$ where M is said metal, and (2) reacting the latter compound with a salt forming compound having the formula ArOH where Ar is an aryl radical, thereby to form a compound having the formula

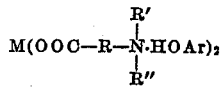

5. Process according to claim 4 wherein the first-named compound is formed by reacting a compound having the formula $HOOC—r—COOH$ with a compound having the formula $HOC_2H_2r'r''NR'R''$ to form a monoester of the dibasic acid.

References Cited in the file of this patent
UNITED STATES PATENTS

| | | |
|---|---|---|
| 2,289,599 | Smith et al. | July 14, 1942 |
| 2,302,384 | Horst | Nov. 17, 1942 |
| 2,366,874 | Reiff | Jan. 9, 1945 |